(12) United States Patent
Ahire et al.

(10) Patent No.: US 12,398,875 B2
(45) Date of Patent: Aug. 26, 2025

(54) LIGHTWEIGHT AND COMPACT ELEVATED APPROACH LIGHT

(71) Applicant: Eaton Intelligent Power Limited, Dublin (IE)

(72) Inventors: Mohan Suklal Ahire, Nashik (IN); Parameswari V L Gundavarapu, Pune (IN); Ramesh Nagendra Birje, Pune (IN); Zahidali Mohammadgous Makandar, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/541,562

(22) Filed: Dec. 15, 2023

(65) Prior Publication Data

US 2024/0200769 A1    Jun. 20, 2024

(30) Foreign Application Priority Data

Dec. 17, 2022 (IN) .............................. 202211073289

(51) Int. Cl.
*F21V 31/00* (2006.01)
*B64D 47/02* (2006.01)
(Continued)

(52) U.S. Cl.
CPC ............ *F21V 31/005* (2013.01); *F21V 29/70* (2015.01); *B64D 47/02* (2013.01);
(Continued)

(58) Field of Classification Search
CPC ...... F21V 31/005; F21V 29/70; F21V 7/0066; F21V 7/0083; F21V 7/28; F21V 15/01;
(Continued)

(56) References Cited

U.S. PATENT DOCUMENTS

| 4,521,836 A | 6/1985 | Puttemanns |
| 9,206,961 B1 | 12/2015 | Bastiani |

(Continued)

FOREIGN PATENT DOCUMENTS

| CN | 102454914 B | 3/2014 |
| CN | 104930418 A | 9/2015 |

(Continued)

*Primary Examiner* — Tsion Tumebo
(74) *Attorney, Agent, or Firm* — Baker Botts L.L.P.

(57) ABSTRACT

A lighting system includes an enclosure that has a back section, side sections, a front section with a front mounting frame, and an interfacing step extending from or coupled to the side sections and located between the front section and the back section. The enclosure includes an outer surface facilitating heat transfer into the environment. The lighting system also includes a conduction frame attached to the interfacing step, and one or more light emitting assemblies attached to the conduction frame. Each of the light emitting assemblies includes a conduction member and a light source attached to the conduction member, and where each conduction member facilitates heat transfer from the light source to the conduction frame. Additionally, a front housing assembly is attached to the front mounting frame of the front section to seal the enclosure from the environment.

21 Claims, 10 Drawing Sheets

(51) Int. Cl.
  *F21V 7/00* (2006.01)
  *F21V 7/28* (2018.01)
  *F21V 29/70* (2015.01)
  *F21Y 107/50* (2016.01)
  *F21Y 107/60* (2016.01)
(52) U.S. Cl.
  CPC ........ *B64D 2203/00* (2013.01); *F21V 7/0066* (2013.01); *F21V 7/0083* (2013.01); *F21V 7/28* (2018.02); *F21Y 2107/50* (2016.08); *F21Y 2107/60* (2016.08)
(58) Field of Classification Search
  CPC . B64D 47/02; B64D 2203/00; F21Y 2107/50; F21Y 2107/60; F21Y 2115/10; B64F 1/20; F21W 2111/06
  See application file for complete search history.

(56) References Cited

U.S. PATENT DOCUMENTS

| | | | |
|---|---|---|---|
| 9,470,407 B2 * | 10/2016 | Abel | ........................ F21V 29/70 |
| 9,829,191 B2 | 11/2017 | Gongola | |
| 10,647,448 B2 | 5/2020 | Hunter | |
| 2006/0007013 A1 * | 1/2006 | Singer | .................... H05B 45/58 |
| | | | 340/815.45 |
| 2009/0296379 A1 | 12/2009 | Tartock | |
| 2013/0094192 A1 | 4/2013 | De | |
| 2015/0009678 A1 * | 1/2015 | Hunter | ...................... F21V 7/09 |
| | | | 362/346 |
| 2015/0362155 A1 * | 12/2015 | Thomsen | ................ F21V 5/008 |
| | | | 362/268 |
| 2019/0086061 A1 * | 3/2019 | Hunter | ................ F21V 19/0015 |
| 2019/0242547 A1 * | 8/2019 | Zhang | ........................ F21K 9/66 |
| 2020/0231301 A1 * | 7/2020 | Hampel | .................... F21V 5/02 |
| 2020/0240616 A1 * | 7/2020 | Sieczkowski | ........... F21V 15/01 |

FOREIGN PATENT DOCUMENTS

| | | |
|---|---|---|
| CN | 106016065 A | 10/2016 |
| CN | 213207440 U | 5/2021 |
| KR | 100945420 B1 | 3/2010 |
| KR | 200450192 Y1 | 9/2010 |
| KR | 101269080 B1 | 5/2013 |

* cited by examiner

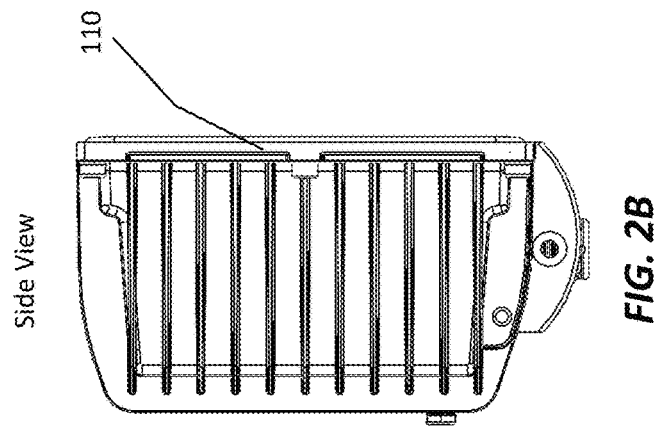
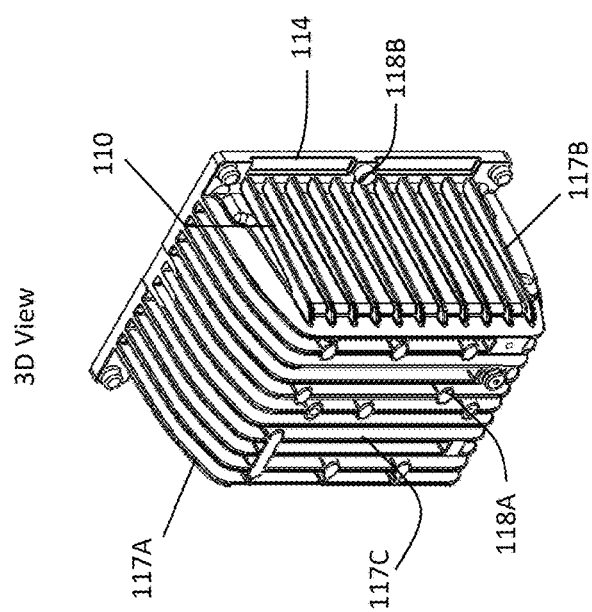
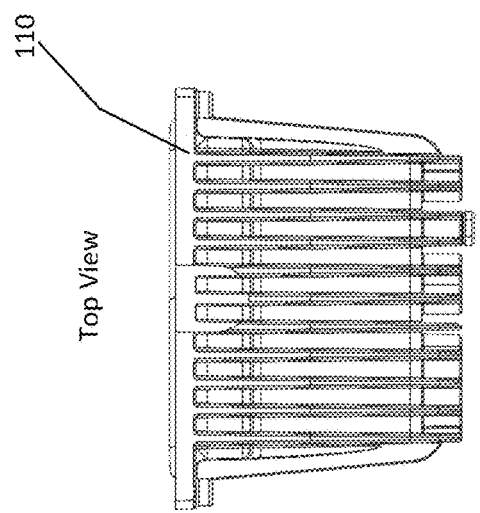

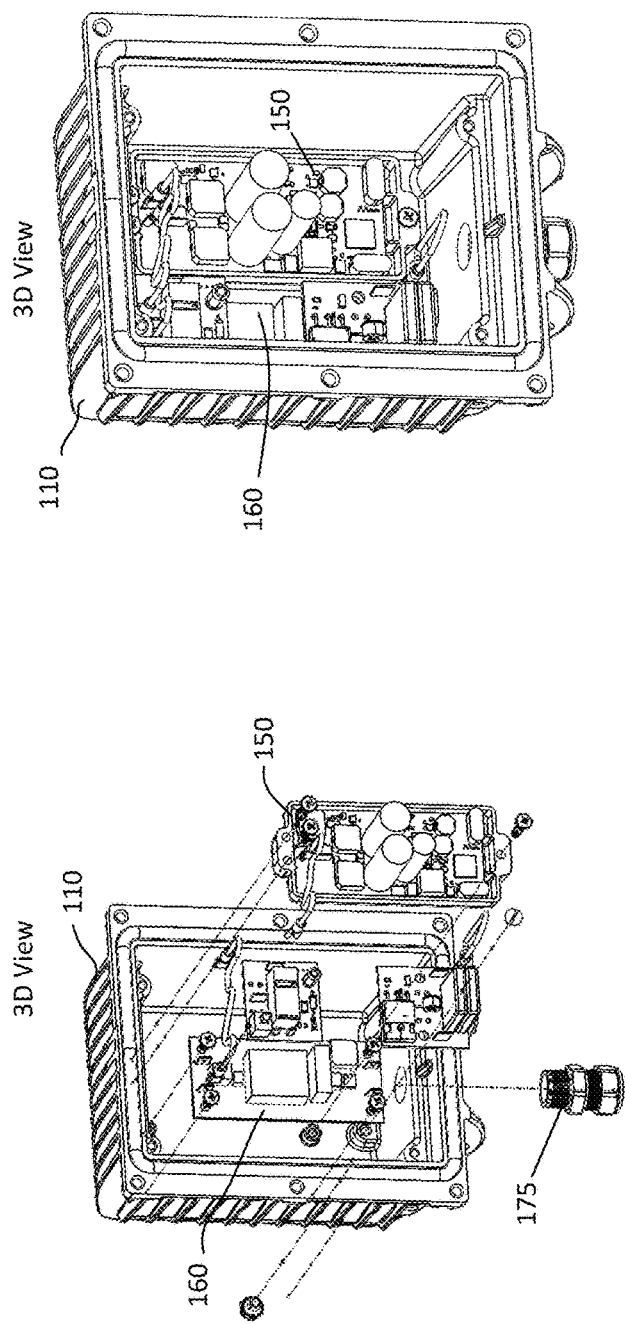
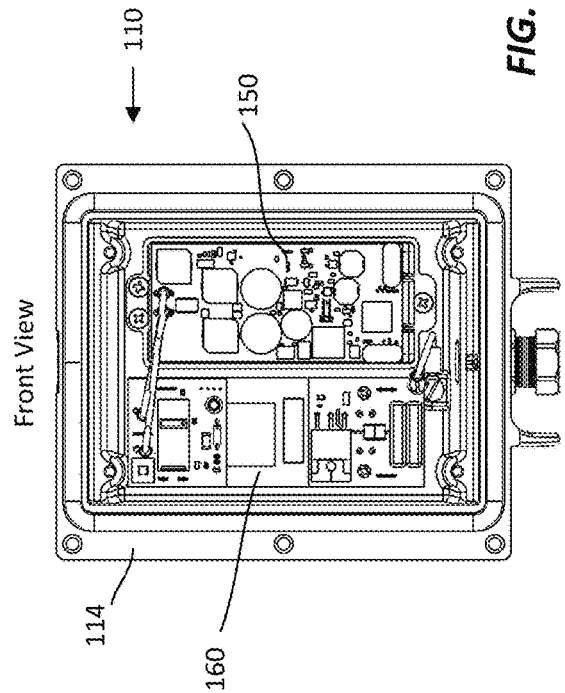
FIG. 5A
FIG. 5B
FIG. 5C

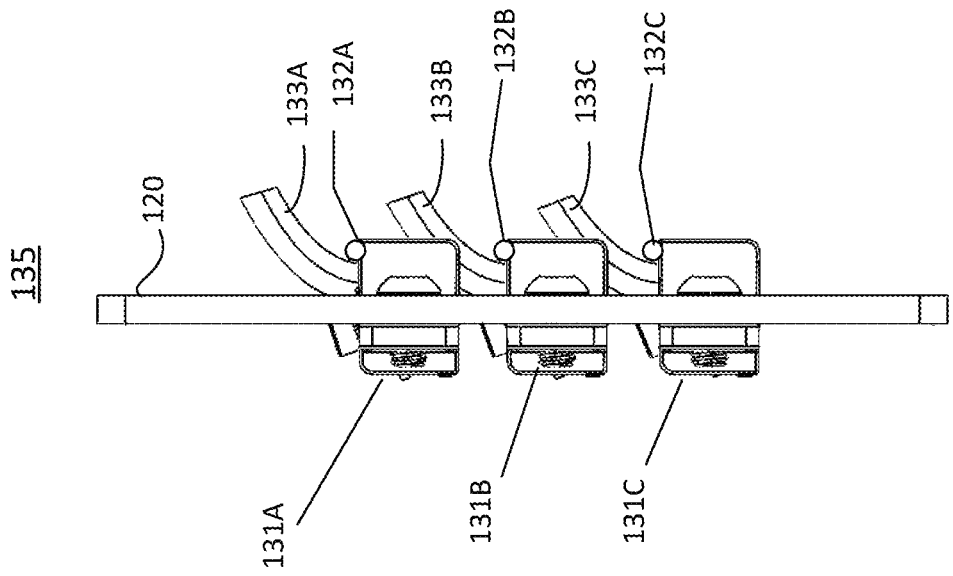
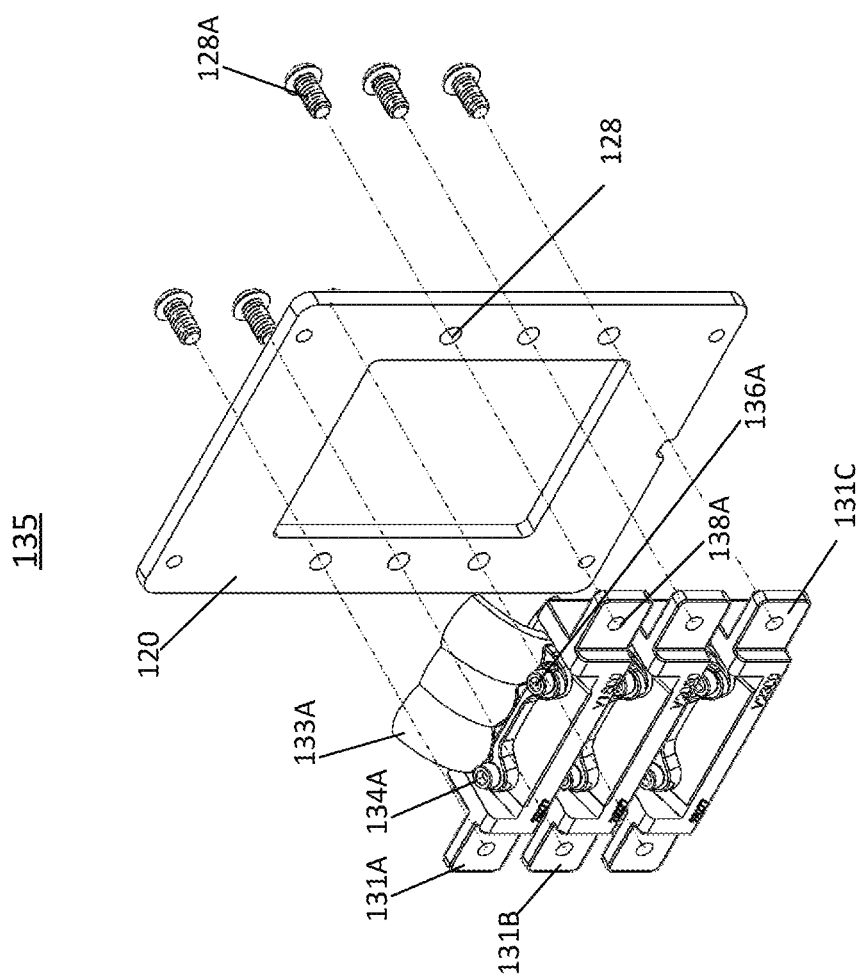
FIG. 7A
FIG. 7B

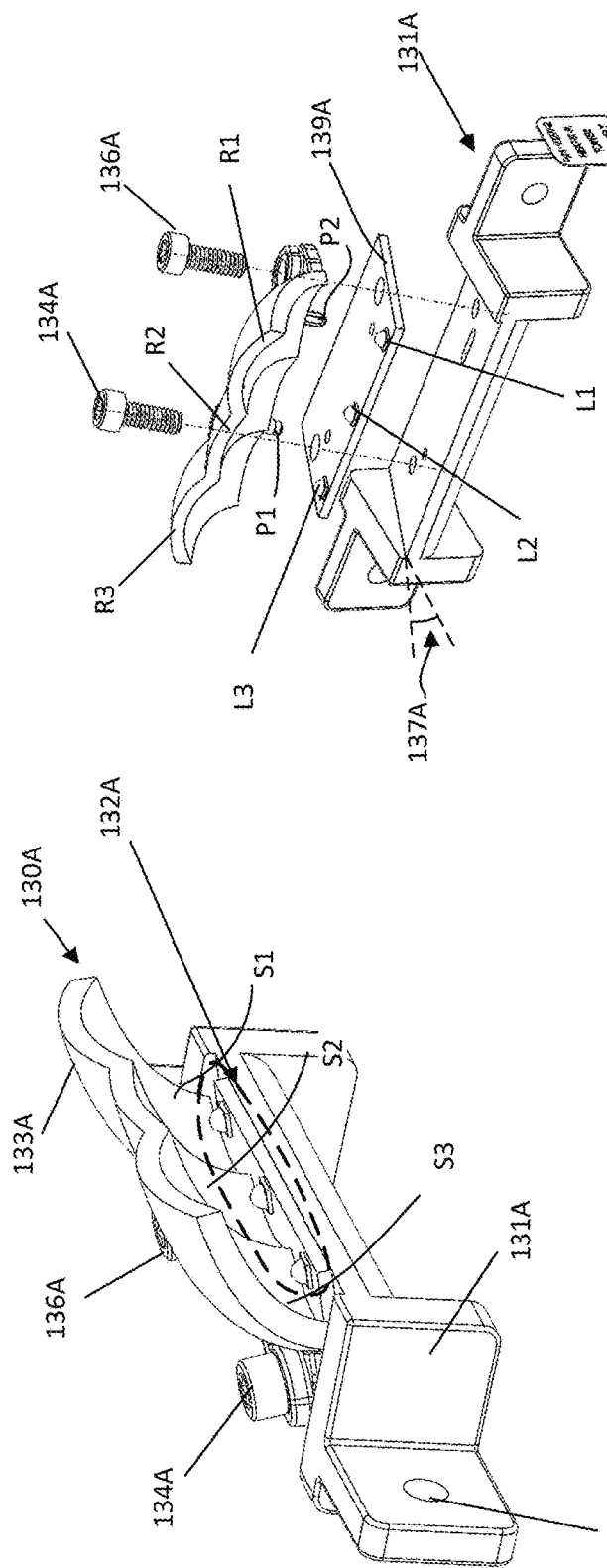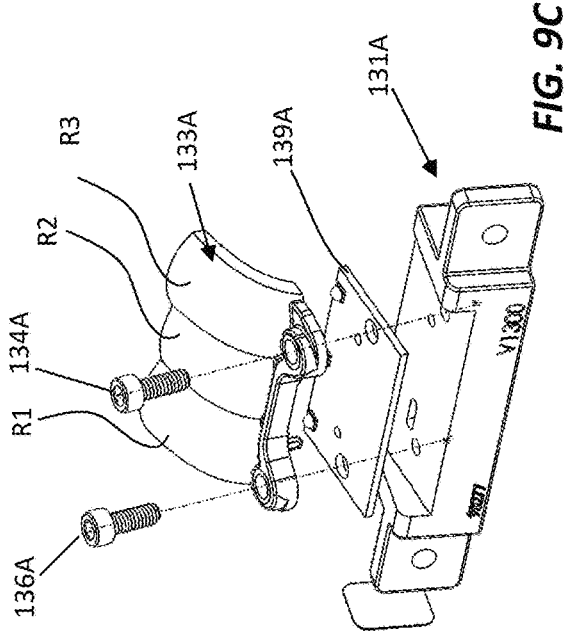
FIG. 9A
FIG. 9B
FIG. 9C

LIGHTWEIGHT AND COMPACT ELEVATED APPROACH LIGHT

CROSS-REFERENCE TO RELATED APPLICATIONS

This application claims the benefit under 35 U.S.C. § 119(a) of Indian Patent Application No. 202211073289, filed Dec. 17, 2022, which are incorporated herein by reference.

TECHNICAL FIELD

This disclosure relates to lighting systems, and in particular the disclosure relates to commercial approach lighting systems designed to illuminate the approach end of an airport runway.

BACKGROUND

Approach lighting systems play a critical role in aviation safety by providing visual guidance to pilots during the landing phase. However, existing systems face challenges. Common issues include susceptibility to environmental conditions such as heavy rain, snow, or fog, which can diminish visibility and compromise the effectiveness of traditional lighting technologies. Additionally, maintenance and durability are key concerns, as frequent exposure to adverse weather conditions can lead to wear and tear, necessitating regular upkeep. Robust approach lighting systems must address these challenges by incorporating advanced technologies resilient to environmental factors, ensuring consistent visibility in various weather conditions. Furthermore, a focus on durability and reduced maintenance requirements is crucial for sustaining optimal performance over time, ultimately contributing to the safety and reliability of aviation operations. Furthermore, the approach lighting systems required to be lightweight, compact, and have an excellent thermal management to facilitate effective removal of heat from light emitting sources into an environment of the approach lighting system.

Consequently, there is a need for an improved design of the approach lighting system, which addresses considerations such as weight, and thermal management, without sacrificing illumination characteristics. The improved design should be well-suited for effectively illuminating the approach end of an airport runway while ensuring resilience to varying environmental conditions.

SUMMARY OF PARTICULAR EMBODIMENTS

Embodiments described herein relate to a lighting system.

In particular non-limiting embodiments, the lighting system includes an enclosure having a back section, side sections, a front section having a front mounting frame, an interfacing step extending from or coupled to the side sections and disposed between the front section and the back section, and an outer surface configured to facilitate a heat transfer from the enclosure into an environment of the lighting system. Further, the lighting system includes a conduction frame fastened to the interfacing step to facilitate a heat transfer from the conduction frame to the enclosure through the interfacing step, and one or more light emitting assemblies fastened to the conduction frame, wherein each of the one or more light emitting assemblies has a conduction member and a light source fastened to the conduction member, and wherein the conduction member is configured to facilitate a heat transfer from the light source to the conduction frame. Further, the lighting system includes a front housing assembly fastened to the front mounting frame of the front section to seal the enclosure from the environment of the lighting system.

In particular non-limiting embodiments, the lighting system further includes a universal power supply and electromagnetic interference filter circuit. The universal power supply and/or the electromagnetic interference filter circuit are mounted onto a back wall of the back section inside the enclosure, thereby facilitating a heat transfer from the universal power supply and/or the electromagnetic interference filter circuit to the enclosure.

In particular non-limiting embodiments, the front housing assembly includes a front housing member having a front housing groove at a back side of the front housing member, the back side of the front housing member facing the one or more light emitting assemblies, and a flexible gasket configured to be inserted into the front housing groove. Further, the front housing assembly includes a flat bezel lens configured to allow a light emitted from the one or more light sources of the one or more light emitting assemblies to exit the enclosure, a nichrome wire heater positioned between the flexible gasket and the flat bezel lens, and a retainer plate being configured to be fastened to the back side of the front housing member causing securing the flat bezel lens, the nichrome wire heater and the flexible gasket to the back side of the front housing member.

In particular non-limiting embodiments, the outer surface of the enclosure includes fins, wherein the fins promote the heat transfer from the enclosure into the environment of the lighting system.

In particular non-limiting embodiments, the enclosure is rotationally coupled to a support member via a hinge member enabling the enclosure to assume an inclined or declined position with respect to a ground level.

In particular non-limiting embodiments, the enclosure is configured to be secured in the inclined or declined position via both a locking mechanism of the hinge member and a secondary locking mechanism, the secondary locking mechanism providing another coupling of the enclosure and the support member.

In particular non-limiting embodiments, the one or more light emitting assemblies are positioned at a plurality of corresponding levels.

In particular non-limiting embodiments, the sealing of the enclosure causes the enclosure to be impervious to dust and capable of resisting water penetration when submerged at a depth of up to one meter.

In particular non-limiting embodiments, a lighting system includes an enclosure, a universal power supply, an electromagnetic interference filter circuit, and a light engine. The light engine includes a plurality of light emitting assemblies. Each light emitting assembly includes a conduction member, a printed circuit board configured to be mounted onto the conduction member at a corresponding inclination angle, one or more light sources configured to be mounted onto the printed circuit board, and a reflector configured to be fastened to the conduction member; and a conduction frame fastened to the plurality of light emitting assemblies and to the enclosure, thereby facilitating a heat transfer from the plurality of light emitting assemblies to the enclosure. Furthermore, any one of the inclination angles corresponding to the printed circuit boards of the plurality of light emitting assemblies is at least one degree different than any other one of the inclination angles.

In particular non-limiting embodiments, the plurality of light emitting assemblies includes at least three light emitting assemblies.

In particular non-limiting embodiments, for each one of the plurality of light emitting assemblies any one of the reflectors has an identical reflector shape as any other one of the reflectors.

In particular non-limiting embodiments, the reflector shape comprises a set of sections, each section from the set of sections configured to reflect a light emitted by a light source adjacent to that section.

In particular non-limiting embodiments, each section from the set of sections includes a curved profile.

In particular non-limiting embodiments, the reflector shape includes a reflective coating formed from a polycarbonate resin.

In particular non-limiting embodiments, the plurality of light emitting assemblies includes first, second, and third light emitting assemblies having corresponding first, second, and third printed circuit boards, mounted at corresponding first, second, and third inclination angles, and wherein the first inclination angle is in a range of 15-20 degrees, the second inclination angle is in a range of 20-22 degrees, and the third inclination angle is in a range of 22-25 degrees.

In particular non-limiting embodiments, the plurality of light emitting assemblies is mounted between the conduction frame and a back side of the enclosure inside of the enclosure.

In particular non-limiting embodiments, the enclosure includes a front housing assembly configured to seal the enclosure when being fastened to a front mounting frame of a front side of the enclosure.

In particular non-limiting embodiments, the plurality of light emitting assemblies is mounted between the conduction frame and the front housing assembly.

In particular non-limiting embodiments, a lighting system includes an enclosure having a back side, and a front side, the front side including a front mounting frame, a universal power supply, an electromagnetic interference filter circuit, and a conduction frame fastened to the enclosure. Further, the lighting system includes one or more light emitting assemblies fastened to the conduction frame, wherein each of the one or more light emitting assemblies has a conduction member and a light source fastened to the conduction member, and a front housing assembly configured to seal the enclosure when being fastened to the front mounting frame of the front side. The front housing assembly includes a front housing member having a front housing groove at a back side of the front housing member, the back side of the front housing member facing the one or more light emitting assemblies, a flexible gasket configured to be inserted into the front housing groove, and a flat bezel lens configured to allow a light emitted from the one or more light sources of the one or more light emitting assemblies to exit the enclosure. Further, the front housing assembly includes a nichrome wire heater positioned between the flexible gasket and the flat bezel lens, and a retainer plate being configured to be fastened to the back side of the front housing member causing securing the flat bezel lens, the nichrome wire heater and the flexible gasket to the back side of the front housing member.

In particular non-limiting embodiments, the nichrome wire heater is configured to regulate a temperature of the flat bezel lens, ensuring required transparency of the flat bezel lens.

In particular non-limiting embodiments, the front mounting frame of the front side includes a front side groove having a selected profile, the lighting system further comprising a flexible O-ring having a circular profile and configured to be inserted into the front side groove, such that at least a portion of the flexible O-ring is extending beyond the front side groove, and wherein the fastening of the front housing assembly to the front mounting frame of the front side includes at least partially compressing the flexible O-ring.

The embodiments disclosed herein are only examples, and the scope of this disclosure is not limited to them. Particular embodiments may include all, some, or none of the components, elements, features, functions, operations, or steps of the embodiments disclosed herein. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 2A-2C are illustrative views of an enclosure, in accordance with disclosed embodiments.

FIG. 5A-5C are other illustrative views of an enclosure of a lighting system containing electrical components, in accordance with disclosed embodiments.

FIGS. 7A-7B are illustrative view of a light engine of a lighting system, in accordance with disclosed embodiments.

FIGS. 9A-9C are illustrative view of components of a light emitting assembly of a light engine, in accordance with disclosed embodiments.

DESCRIPTION OF EXAMPLE EMBODIMENTS

Figure 1:
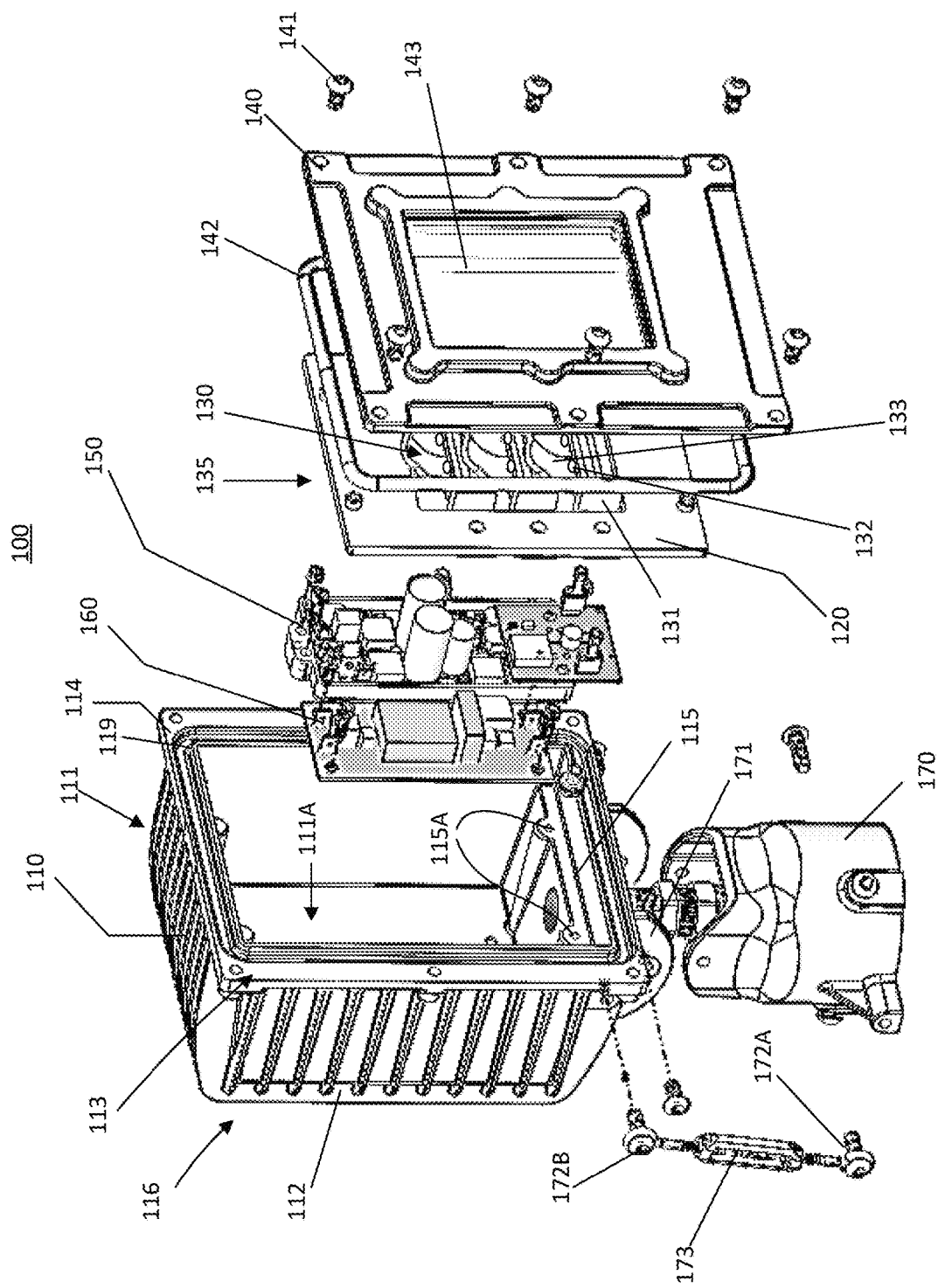
FIG. 1 is an illustrative exploded view of a lighting system, in accordance with disclosed embodiments.

In the following description, for the purposes of explanation, numerous specific details are set forth to provide a thorough understanding of the present disclosure. It will be apparent, however, that embodiments of the present disclosure may be practiced without these specific details.

Various embodiments may be described in this disclosure to illustrate various aspects. Other embodiments may be utilized and structural, electrical, and other changes may be made without departing from the scope of the embodiments that are specifically described. Various modifications and alterations are possible and expected. Some features may be described with reference to one or more embodiments or drawing figures, but such features are not limited to usage in the one or more embodiments or figures with reference to which they are described. Thus, the present disclosure is neither a literal description of all embodiments nor a listing of features that must be present in all embodiments.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Terms such as "same," "equal," "planar," or "coplanar," as used herein when referring to orientation, layout, location, position, shapes, sizes, amounts, or other measures do not necessarily mean an exactly identical orientation, layout, location, position, shape, size, amount, or other measure, but are intended to encompass nearly identical orientation, layout, location, position, shapes, sizes, amounts, or other measures within acceptable variations that may occur, for example, due to manufacturing processes. The term "substantially" may be used herein to emphasize this meaning, unless the context or other statements indicate otherwise. For example, items described as "substantially the same," "substantially equal," or "substantially planar," may be exactly the same, equal, or planar, or may be the same, equal, or planar within acceptable variations that may occur, for example, due to manufacturing processes.

Terms such as "about" or "approximately" may reflect sizes, orientations, or layouts that vary only in a small relative manner, and/or in a way that does not significantly alter the operation, functionality, or structure of certain elements. For example, a range from "about 0.1 to about 1" may encompass a range such as a 0%-10% deviation around 0.1 and a 0% to 10% deviation around 1, especially if such deviation maintains the same effect as the listed range. Moreover, as an example, the expression "about 20 degrees" encompasses all degree values within the range of 18 to 22 degrees.

Embodiments described herein relate to a lighting system that can be used for approach lighting. Such lighting system can be designed to illuminate an approach end of an airport runway. The design of approach lighting systems necessitates a careful consideration of key engineering principles to ensure optimal performance and longevity in various environmental conditions. One critical aspect is the need for lightweight construction, which is essential to minimize structural load and facilitate easy installation. Additionally, hermetic sealing is a fundamental requirement to safeguard the internal components from moisture, dust, and other potentially damaging elements. This protective measure not only ensures the longevity of the system but also contributes to its reliability by preventing corrosion and electrical malfunctions. Robustness in the face of diverse environmental challenges, including extreme temperatures, precipitation, and exposure to UV radiation, is equally crucial. The design must account for materials and coatings that withstand these conditions, promoting durability and sustained functionality. In essence, a well-crafted approach lighting system demands a harmonious integration of lightweight design, hermetic sealing, and robust engineering to meet the demanding standards of aviation safety and operational excellence.

An example exploded view of a lighting system 100 is show in FIG. 1. The system includes an enclosure 110 having a back section 111, side sections 112, a front section 113 having a front mounting frame 114, an interfacing step 115 extending from or coupled to side sections 112 and disposed between front section 113 and back section 111, and an outer surface 116 of enclosure 110 configured to facilitate a heat transfer from enclosure 110 into an environment of the lighting system 100.

Further, lighting system 100 includes a conduction frame 120 fastened to interfacing step 115 to facilitate heat transfer from conduction frame 120 to enclosure 110 through interfacing step 115. Additionally, lighting system 100 includes one or more light emitting assemblies 130 fastened to conduction frame 120, wherein one or more light emitting assemblies 130 has corresponding conduction members 131 and light sources 132 fastened to conduction members 131. Each one of conduction members 131 is configured to facilitate a heat transfer from light sources 132 to conduction frame 120. In various embodiments, conduction frame 120 and one or more light emitting assemblies 130 fastened to it form a light engine 135 for lighting system 100.

Furthermore, lighting system 100 includes a front housing assembly 140 fastened to front mounting frame 114 of front section 113 to seal enclosure 110 from the environment of lighting system 100. Additionally, lighting system 100 may include a power supply 150, which may be, for example, a universal power supply, and can be adaptable to provide power to different configurations of light engines 135. Furthermore, lighting system 100 may include an electromagnetic interference filter circuit 160 configured to prevent various electrical components of lighting system 100 to be influenced by electromagnetic radiation from the environment of lighting system 100.

In various embodiments, enclosure 110 is configured to house most of the components of lighting system 100, such as light engine 135, power supply 150, and electromagnetic interference filter circuit 160. Enclosure 110 can be formed from any suitable structurally stable and thermally conductive material, such as aluminum, plastic, steel, stainless steel, aluminum alloy, die-cast aluminum, titanium, fiberglass, acrylic, polycarbonate, thermoplastic, or any suitable metallic, plastic, or composite material. In some cases, enclosure 110 may be partially or entirely made of flexible materials such as rubber, flexible plastic, or fabric (e.g., fiberglass fabric).

As shown in FIG. 1, enclosure 110 is selected to have generally rectangular cross-section. FIGS. 2A-2C show different views of enclosure 110. For example, FIG. 2A shows a three-dimensional view of enclosure 110 as viewed from the back side, FIG. 2B shows a side view of enclosure 110 (as viewed from the right side of enclosure 110), and FIG. 2C shows the top view of enclosure 110. As seen from FIGS. 2A-2C, enclosure 110 includes fins 117A located at the top side of enclosure 110, fins 117B located at sides of enclosure 110, and fins 117C located at the back side of enclosure 110. Fins 117A-117C primarily facilitate convective heat transfer from enclosure 110 to the environment surrounding lighting system 100, although some conductive heat transfer may also occur.

In several embodiments, fins 117A-117C serve dual functions by not only offering surfaces for a convective heat transfer but also enhancing the structural dexterity of enclosure 110. Illustrated in an exemplary embodiment, as depicted in FIGS. 1-2C, fins 117A-117C are seamlessly integrated into enclosure 110. In this scenario, enclosure 110 could be manufactured, for instance, by shaping a single metallic or plastic sheet, thereby creating fins 117A-117C as an integral part of the same metal or plastic sheet. This integration not only streamlines the manufacturing process but also reinforces the structural integrity of both the fins and the overall enclosure.

Further, as shown in FIGS. 2A-2C, enclosure 110 includes front mounting frame 114 to which front housing assembly 140 is attached as further described below. Similarly, to fins 117A-117C, front mounting frame 114 may be seamlessly integrated into enclosure 110, for example, by shaping a single metallic or plastic sheet, thereby creating front mounting frame 114 as an integral part of enclosure 110.

Furthermore, enclosure 110 may incorporate regions containing threaded openings, such as regions 118A and 118B which are configured to receive suitable fasteners, such as bolts or screws for fastening different components of lighting system 100 to enclosure 110.

Returning to FIG. 1, various sides/sections of enclosure 110 (e.g., back section 111, side sections 112, and front section 113) are configured to transfer heat to an environment of lighting system 100, and at the same time, serve as surfaces or regions for fastening different components of lighting system 100. For example, a back side 111A of back section 111 may be used for mounting at least some of the electrical components of lighting system 100, such as for example, power supply 150, and/or electromagnetic interference filter circuit 160.

In one implementation, power supply 150 may be first mounted to back side 111A of back section 111 of enclosure 110, while electromagnetic interference filter circuit 160, may then be mounted over power supply 150. Alternatively, electromagnetic interference filter circuit 160, may be mounted onto back side 111A, while power supply 150 may then be mounted over electromagnetic interference filter circuit 160. In some configurations, both power supply 150 and electromagnetic interference filter circuit 160 may be mounted onto back side 111A of back section 111 of enclosure 110. In some cases, when mounting electrical components (e.g., power supply 150 or electromagnetic interference filter circuit 160) over any of the internal surfaces of enclosure 110, these components may include large surface areas in which they are in contact with internal surfaces of enclosure 110, thereby ensuring an adequate heat transfer from these components to sides of enclosure 110. In some cases, the heat transfer may be further facilitated by using a thermal grease between heat conductive surfaces of electronic components of lighting system 100 and internal surfaces of enclosure 110. In some cases, the surfaces of electronic components may include protrusions or cavities configured to be inserted into corresponding cavities or protrusion within internal surfaces of enclosure 110, thereby facilitating heat transfer between the electronic components and enclosure 110.

In various embodiments, enclosure 110 features an interfacing step 115 extending from the side sections 112 of enclosure 110, as depicted in FIG. 1. This interfacing step 115 serves as an element to which conduction frame 120 may be affixed. Specifically, conduction frame 120 can be securely attached to threaded openings 115A of interfacing step 115 using appropriate fasteners such as bolts or screws. Notably, certain regions of the surfaces of conduction frame 120 are designed to be in close contact with and flushed adjacent to the surfaces of interfacing step 115. Such design facilitates the efficient heat transfer from conduction frame 120 to interfacing step 115. In certain instances, a thermal grease may be applied to an interface between the conduction frame 120 and interfacing step 115 to enhance heat conductivity, promoting optimal heat transfer between the two components.

Conduction frame 120 can be constructed from a variety of materials chosen for their excellent heat conductivity properties. Suitable materials include, but are not limited to, aluminum, aluminum alloys, copper, copper alloys, stainless steel, and thermoplastics. These materials are selected based on their ability to efficiently transfer heat, contributing to the overall thermal management of the system. Additionally, the choice of material depends on factors such as the specific requirements of the application, durability, heat expansion, weight considerations, and cost-effectiveness. The flexibility to use diverse materials underscores the adaptability of conduction frame 120 to different thermal challenges in various contexts.

As described above, conduction frame 120 and one or more light emitting assemblies 130 fastened to conduction frame 120 form light engine 135. An example light emitting assembly 130 may include an assembly of conduction members 131, one or more reflectors 133 and one or more light sources 132. In various embodiments, conduction members 131 are configured to support one or more light sources 132 and one or more reflectors 133. In various embodiments, one or more light sources 132 may be mounted onto conduction members 131. In some configuration, one or more light sources 132 may be mounted onto one or more printed circuit boards, and the printed circuit boards may be attached to conduction members 131. Further, reflectors 133 may also be fastened or otherwise attached to conduction members 131.

Conduction members 131 may be any suitable elements configured to support one or more light sources 132, one or more reflectors 133, and/or a printed circuit board. Further, conduction members 131 are configured to be attached to conduction frame 120, such that the heat generated by one or more light sources 132 is conducted from the one or more light sources 132 towards and into conduction frame 120. In various example embodiments, conduction members 131 may be formed from a material capable of conducting heat, such as metal. In some cases, conduction members 131 may be formed from any suitable heat conducting material such as aluminum, aluminum alloys, copper, copper alloys, stainless steel, and thermoplastics, among others. These materials are selected based on their ability to efficiently transfer heat, contributing to the overall thermal management of the system. Additionally, the choice of material depends on factors such as the specific requirements of the application, durability, heat expansion, weight considerations, and cost-effectiveness.

In some embodiments, conduction members 131 may be fastened to conduction frame 120 using any suitable fasteners, such as bolts or screws. In some cases, a thermal grease may be used when fastening conduction members 131 and conduction frame 120 to improve heat conductivity at the interface of conduction members 131 and conduction frame 120. In some cases, conduction members 131 and conduction frame 120 may be formed from the same sheet of metal, thereby improving heat conductivity from one or more light sources 132 to conduction frame 120. In some cases, conduction members 131 may be welded to conduction frame 120.

In various embodiments, when conduction frame 120 is fastened to interfacing step 115, light engine 135 is secured within enclosure 110. To protect the electronic components (e.g., power supply 150, electromagnetic interference filter circuit 160, and light engine 135), enclosure 110 may be sealed by fastening front housing assembly 140 to front mounting frame 114 of front section 113. Front housing assembly 140 may be fastened to front mounting frame 114 via suitable fasteners 141 (e.g., bolts or screws) configured to be fastened to threaded openings within front mounting frame 114. When fastening front mounting frame 114, a flexible O-ring 142 may be placed in a front side groove 119 of front mounting frame 114, such that flexible O-ring 142 is positioned partially within and between front mounting frame 114 and front housing assembly 140.

Figure 3A:
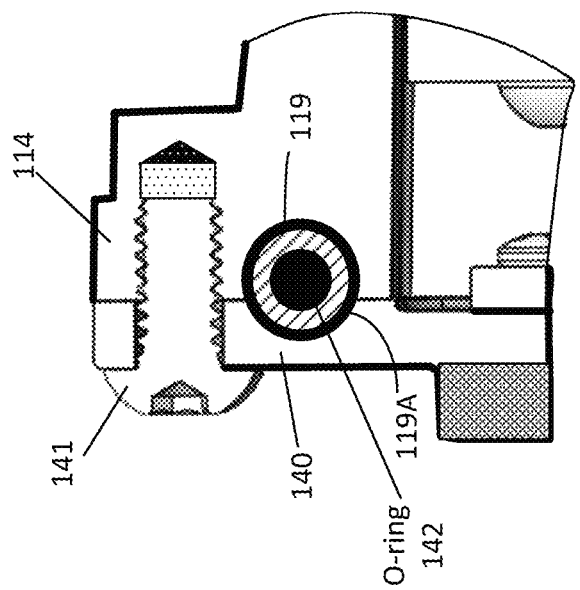
FIGS. 3A and 3B are illustrative implementations of an interface between a front housing assembly and an enclosure, in accordance with disclosed embodiments.
Figure 3B:
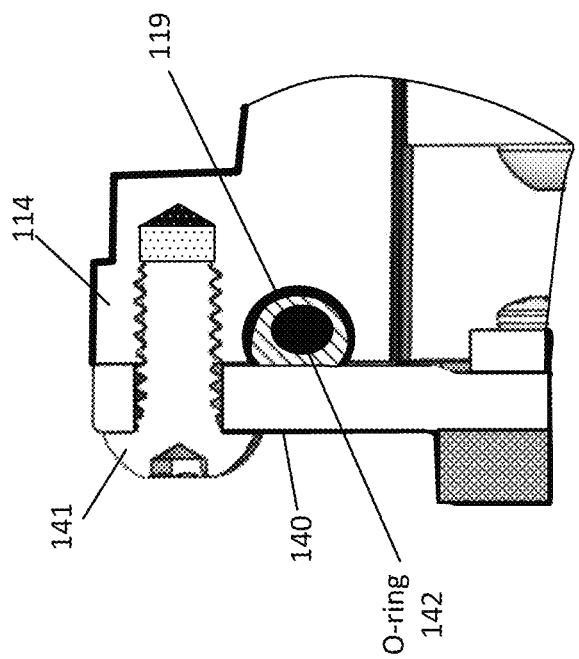

FIG. 3A presents a cross-sectional view illustrating an exemplary configuration of the lighting system 100, where front housing assembly 140 is securely fastened to front mounting frame 114 utilizing a fastener 141. In this specific implementation, front side groove 119 accommodates flexible O-ring 142, which can be compressed by front housing assembly 140 during the attachment process to front mounting frame 114. Alternatively, as depicted in FIG. 3B, an alternative arrangement involves the inclusion of a groove 119A within front housing assembly 140. This design allows flexible O-ring 142 to maintain its more or less uncompressed form within grooves 119 and 119A while front housing assembly 140 being affixed to the front mounting frame 114 using fastener 141.

Flexible O-ring 142 can adopt various cross-sectional profiles, including circular, rectangular, square, elliptical, and others. In certain instances, as illustrated in FIG. 3A, when inserted into the front side groove 119, a portion of flexible O-ring 142 may extend beyond front side groove 119. Consequently, during the fastening of front housing assembly 140 to front mounting frame 114, there is a partial compression of flexible O-ring 142.

Flexible O-ring 142 can be composed of suitable materials such as rubber, flexible plastics, or equivalent materials. Notably, in one implementation, the chosen material for flexible O-ring 142 is engineered to withstand environmental factors, including humidity and exposure to chemicals such as fuel gases, while maintaining its flexibility over time. In some cases, flexible O-ring 142 may include one or more cavities, and/or can be formed from a composite material. For example, flexible O-ring 142 may include structural flexible threads forming from any suitable flexible material, such as plastic, metal, fiberglass, and the like.

As shown in FIG. 1, front housing assembly 140 includes a window 143 configured to transmit light emitted by one or more light sources 132 into the environment of lighting system 100. Window 143 may be formed from any suitable material transparent to light emitted from light sources 132. For example, window 143 may be made from transparent plastic, transparent glass, or any other suitable transparent material (e.g., quarts, sapphire, and the like). In some cases, window 143 may include suitable light guiding elements (e.g., optical elements) integrated into window 143 and configured to direct or otherwise distribute light from one or more light sources 132. For instance, such light guiding elements may include curved or flat lenses, such as bezel lenses, prisms, reflectors, diffraction gratings, combination thereof, and the like. In some cases, the light guiding elements may be located adjacent to window 143. For instance, such light guiding elements may be positioned between light engine 135 and window 143.

In various embodiments, enclosure 110 of lighting system 100 may be is rotationally coupled to a support member 170 via a hinge member 171 enabling enclosure 110 to assume an inclined or declined position with respect to a ground level. Enclosure 110 may be configured to be secured in the inclined or declined position via both a locking mechanism of hinge member 171 and a secondary locking mechanism 173. In various cases, secondary locking mechanism 173 may provide another coupling of enclosure 110 and support member 170, thereby providing an additional structural joint between enclosure and support member 170. For example, second locking mechanism 173 may be attached to support member 170 using a fastener 172A and attached to enclosure 110 using a fastener 172B. In some cases, secondary locking mechanism 173 can secure enclosure 110 in a specific orientation relative to the ground level. This includes adjusting its inclination or decline, and even swiveling it left, right, or both.

Figure 4B:
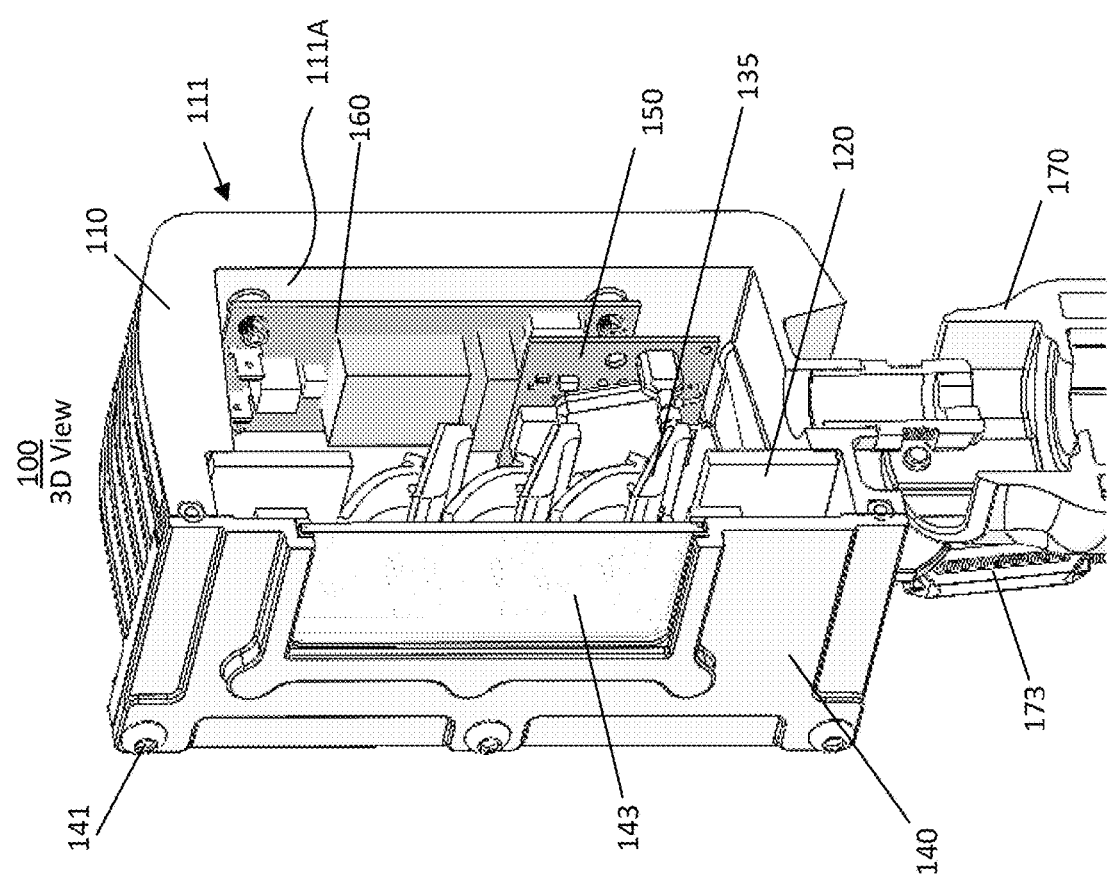
FIG. 4A-4B are illustrative views of a lighting system, in accordance with disclosed embodiments.
Figure 4A:
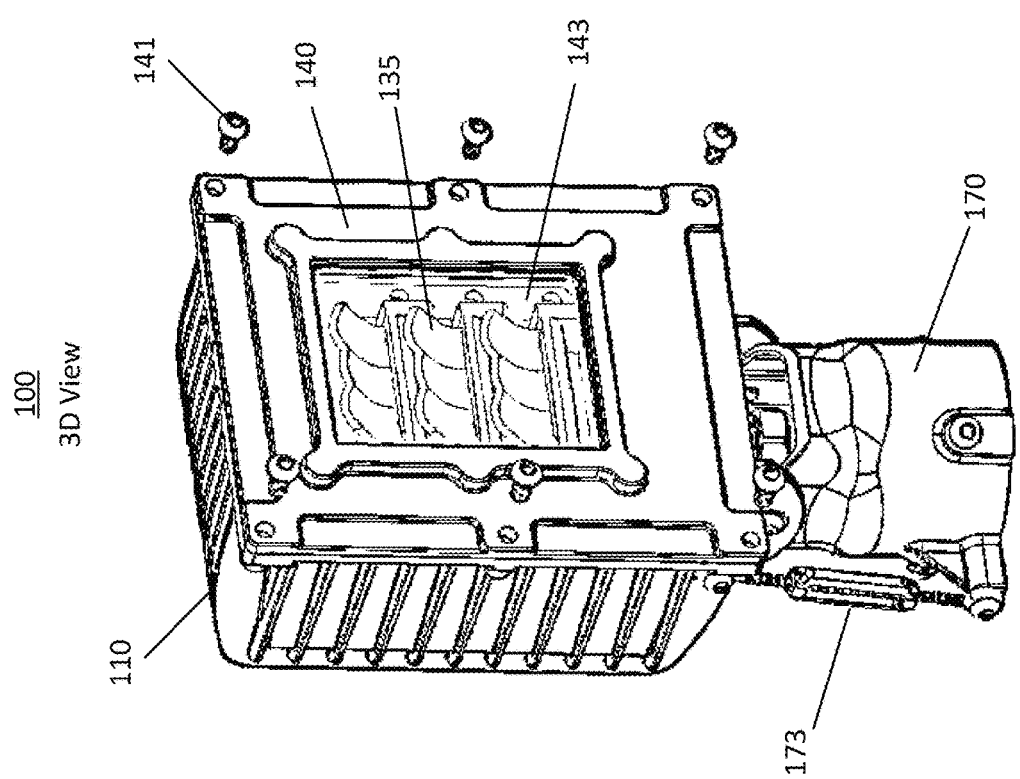

While FIG. 1 provides the exploded view of lighting system 100, FIG. 4A provides a three-dimensional view of lighting system 100 when it is completely assembled. As shown in FIG. 4A, the lighting system 100 includes enclosure 110, support member 170 for supporting enclosure 110, secondary locking mechanism 173, front housing assembly 140 being fastened to front mounting frame 114 via fasteners 141, and elements of light engine 135 seen through window 143 of front housing assembly 140. Further, FIG. 4B shows a cross-sectional view of lighting system 100. As shown in FIG. 4B, lighting system 100 includes enclosure 110, front housing assembly 140 having transparent window 143 and attached to enclosure 110 via fasteners 141, support member 170, and secondary locking mechanism 173. Further, within enclosure 110, FIG. 4B shows a portion of conduction frame 120, a portion of light engine 135, a power supply 150, and electromagnetic interference filter circuit 160 fastened to back side 111A of back section 111.

FIGS. 5A-5C offer perspective views of the electrical components housed within the enclosure 110. In particular, FIG. 5A presents a three-dimensional exploded view, showing the internal arrangement of enclosure 110 along with the presence of power supply 150 and electromagnetic interference filter circuit 160. Notably, a pole 175 is featured, strategically positioned for attaching the enclosure 110 to the support member 170 (although support member 170 is not depicted in FIG. 5A).

FIG. 5B shows an alternative view of enclosure 110 depicting internal components including power supply 150 and electromagnetic interference filter circuit 160. This internal perspective is presented without the front housing assembly 140, allowing for a detailed examination of the electrical elements. Further, FIG. 5C offers a frontal view of enclosure 110, providing insight into its internal structure while omitting the front housing assembly 140. These various views collectively contribute to a comprehensive understanding of the electrical configurations and structural nuances within the enclosure 110 of lighting system 100.

Figure 6:
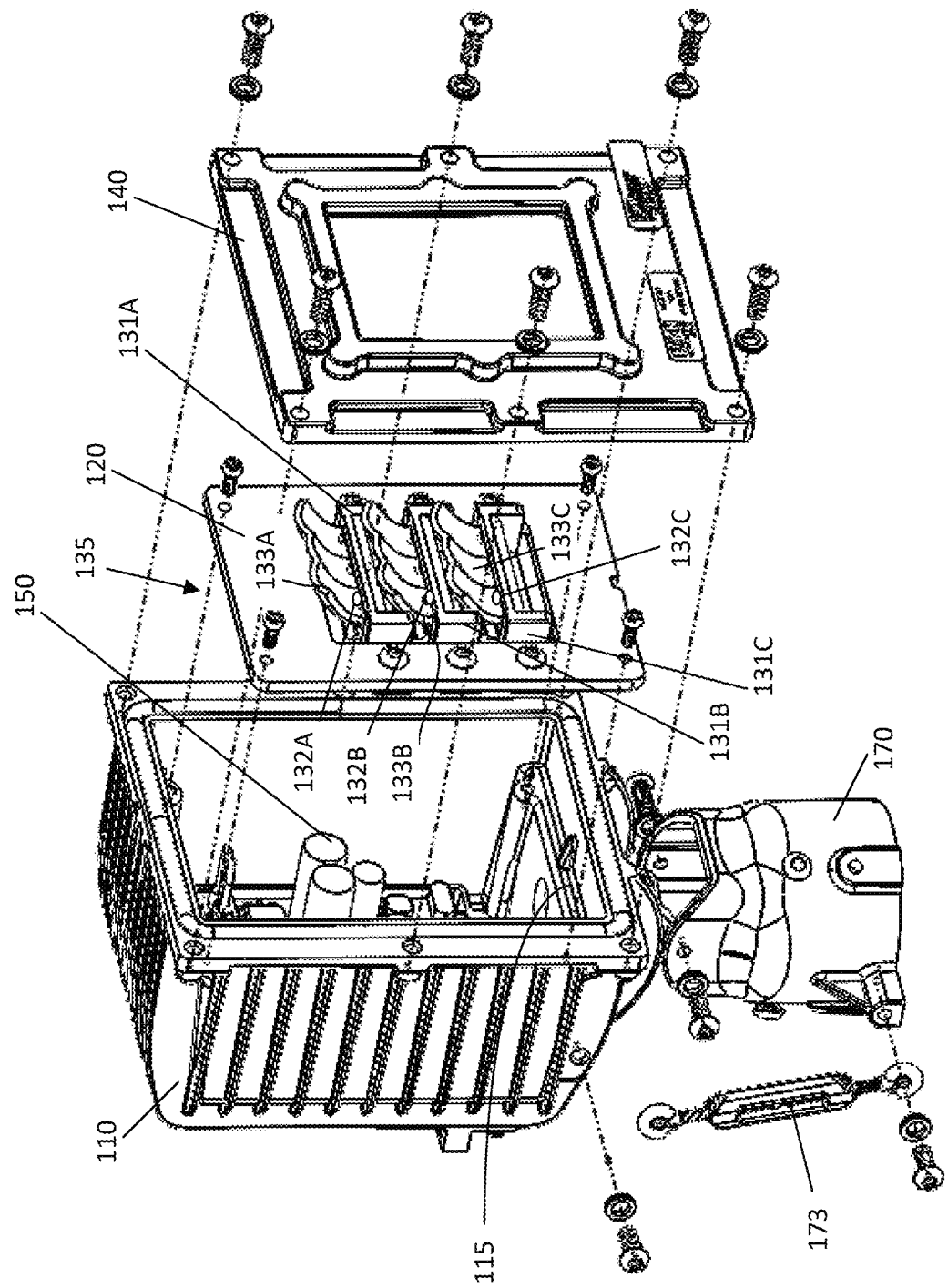
FIG. 6 is an illustrative exploded view of a lighting system, in accordance with disclosed embodiments.

Another exploded view of lighting system 100 is shown in FIG. 6. Lighting system 100 includes enclosure 110, support member 170, secondary locking mechanism 173, electronic components such as power supply 150, font housing assembly 140 configured to be fastened to front mounting frame 114, and light engine 135.

Light engine 135 includes conduction frame 120 configured to be fastened to interface step 115, and several conduction members 131A-131C configured to support light sources 132A-132C and reflectors 133A-133C, as well as to facilitate heat transfer from light sources 132A-132C and various electronic components of light engine 135 to conduction frame 120. While three conduction members 131A-131C are shown, in some cases, light engine 135 may have fewer than three conduction members, and in other cases, light engine 135 can have more than three conduction members.

The thickness and material selection for conduction members 131A-131C play an important role in achieving the necessary heat management for the optimal functioning of light engine 135. Specifically, in certain instances, these parameters are chosen to regulate the temperature of light sources 132A-132C within the prescribed acceptable range.

As previously outlined, the combination of a conduction member, one or more light sources, and a reflector constitutes a light emitting assembly. Illustrated in FIG. 6, light engine 135 exemplifies this configuration, featuring three distinct light emitting assemblies.

In various embodiments, the design of light engine 135 can be adaptable, and in certain scenarios, it may include more than three light emitting assemblies. Such configuration may allow for redundancy within the system, mitigating potential issues arising from the failure or overheating of individual light emitting assemblies. For instance, in cases where redundancy is incorporated, if one operational light emitting assembly experiences overheating, a redundant light emitting assembly can seamlessly take over, while the overheated unit is temporarily deactivated, enabling it to cool down before reengagement. This approach ensures the continued functionality and reliability of light engine 135 under varying operational conditions.

In illustrative embodiment of the light engine 135 is shown in FIGS. 7A-7B, 8A-8B, and 9A-9C. FIG. 7A presents an exploded three-dimensional perspective, depicting various components of the light engine 135. These components include conduction members 131A-131C, reflectors of the light emitting assemblies (e.g., reflector 133A in FIG. 7A), and the conduction frame 120, to which conduction members 131A-131C are affixed. In a specific implementation, conduction members 131A-131C incorporate threaded openings, such as opening 138A, aligned with an opening 128 of the conduction frame 120. This alignment facilitates the insertion of a fastener 128A into opening 128, securely attaching it to threaded opening 138A, thereby effecting the robust fastening of the conduction frame 120 to conduction member 131A. It is noteworthy that, in certain instances, opening 128 may also feature threading, enhancing the stability of the attachment.

In various embodiments, reflectors of light engine 135, such as reflector 133A, as shown in FIG. 7A, may be mounted onto respective conduction members (e.g., reflector 133A is mounted onto conduction member 131A) using suitable fasteners such as fasteners 134A and 136A, which may include bolts or screws. In some cases, fasteners 134A and 136A include washers, or any other suitable elements for facilitating accurate positioning of reflector 133A relative to conduction member 131A. For example, suitable washers may be used for selecting a vertical positioning of reflector 133A relative to conduction member 131A.

FIG. 7B shows a side view of light engine 135 including conduction frame 120, conduction members 131A-131C, light sources 132A-132C, and reflectors 133A-133C. As described above, light sources 132A-132C and reflectors 133A-133C are configured to be mounted onto respective conduction members 131A-131C.

Figure 8B:
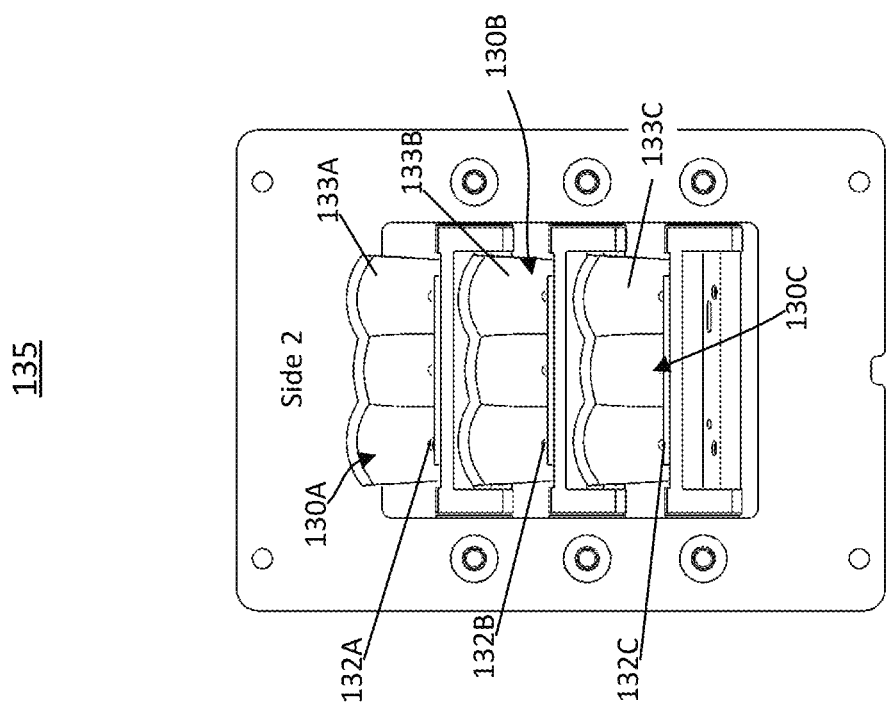
FIGS. 8A-8B are other illustrative view of a light engine of a lighting system, in accordance with disclosed embodiments.
Figure 8A:
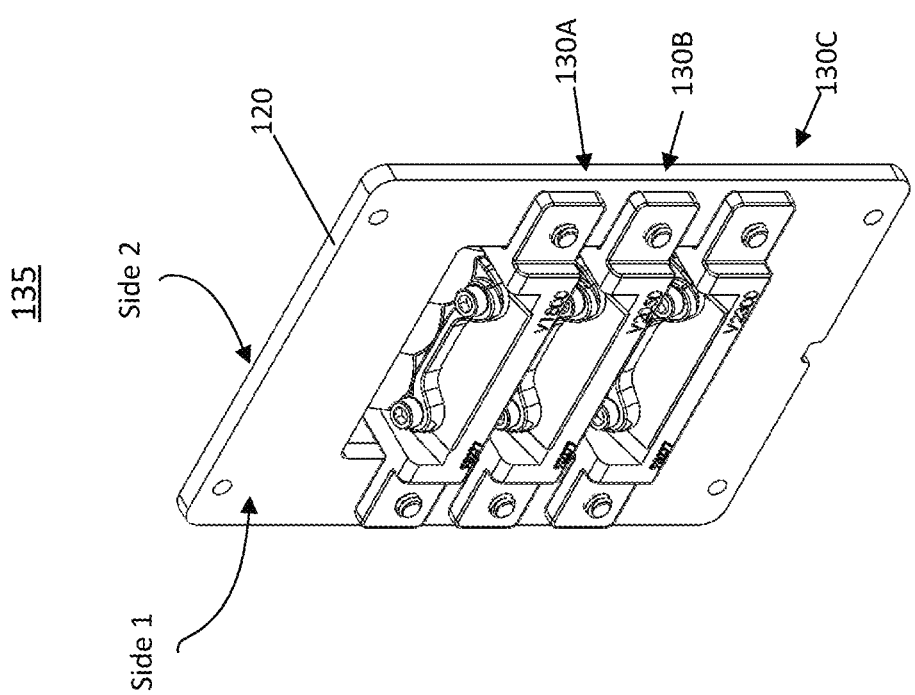

FIG. 8A shows a three-dimensional view of the light engine 135, featuring three distinct light emitting assemblies, denoted as 130A-130C. The complementary FIG. 8B provides a front-facing perspective of the light engine 135, highlighting the arrangement of the three light emitting assemblies.

Examining FIG. 8A, the conduction frame 120 exhibits a first side (referred to as side 1). This side is positioned within the enclosure 110, facing the back side 111A of the back section 111. Additionally, conduction frame 120 includes a second side (side 2), oriented to face the window 143 of the front housing assembly 140. It is important to note that in FIG. 8B, the light sources 132A-132C and reflectors 133A-133C are situated on side 2 of the conduction frame 120. This configuration ensures that the light emitted by the light sources 132A-132C is directed towards the window 143, contributing to the effective illumination and functionality of the lighting system.

FIG. 9A shows an example light emitting assembly 130A which includes conduction member 131A, light sources 132A, reflector 133A coupled to conduction member 131A via bolts 134A and 136A. Further, as shown in FIG. 9A, conduction member 131A includes a threaded opening 138A which can be used for fastening conduction member 131A to conduction frame 120.

Note that in the implementation of light emitting assembly 130A, as shown in FIG. 9A, three light sources are used as light sources 132A. In various embodiments, light sources 132A may include any suitable number of individual light sources. For example, light sources 132A may include one, two, three, four, five, or more light sources. Furthermore, light sources 132A may be any suitable light sources of any suitable light. For example, when light sources 132A are configured to emit visible light, such light sources may be light emitting diodes, incandescent bulbs, fluorescent bulbs, or any other suitable light sources activated by an electrical current and/or voltage. Light sources 132A (or any other light sources of light engine 135) may emit at any suitable visible wavelength. For example, such light sources may be configured to emit at wavelengths ranging between purple (e.g., wavelength of about 380-450 nanometers (nm)) to red wavelengths of about 700 nm).

Furthermore, in some cases, light sources 132A may be configured to emit at a wavelength that is not visible to a human eye (e.g., infrared wavelength, ultraviolet wavelength, microwave wavelength, radio-frequency wavelength, and the like).

Reflectors, such as reflector 133A may be made from any suitable material, such as metal, plastic, or any other suitable material capable of reflecting light emitted by light sources 132A. In some cases, reflectors may include coatings configured to facilitate reflection of light from reflector 133A. For instance, a coating can be a thin metal coating, a thin plastic coating (e.g., polycarbonate resin), or any other coating, which in some cases can include multiple coating layers forming a reflective mirror. Such coating layers may have a thickness on the order of a wavelength of emitted light from light sources 132A, or a fraction of the wavelength. Specific design of the coating may be selected based on the wavelength of light for light sources 132A. For example, the coating layers may be selected to form a Bragg reflector.

In various cases, reflector 133A (or any other reflector of light engine 135) may include several sections such as sections R1, R2, and R3, as shown in FIG. 9C. Each section may be dedicated for reflecting light from a particular light source L1, L2, and L3, as shown in FIG. 9B. Each section may include a curved reflective surface which can have a selected profile. For example, reflector 133A includes surfaces S1, S2, and S3, as shown in FIG. 9A. In an example implementation, profiles for surfaces may be parabolic, spherical, or any other suitable shape. In some cases, sections of reflector 133A may be positioned relative to light sources L1, L2, and L3, such that these light sources are placed close to corresponding focal points of these reflector sections. Alternatively, light sources L1, L2, and L3, may be placed in regions that are not necessarily close to those focal points.

As shown in FIGS. 9B and 9C, light sources L1, L2, and L3 may be mounted on a printed circuit board 139A. In turn, printed circuit board 139A is configured to be mounted onto conduction member 131A such that there is an inclination angle 137A, as shown in FIG. 9B formed between a plane of circuit board 139A and a ground level. Angle 137A may be defined as $\mathrm{acos}(N_1 \cdot N_2)$, where $N_1$ is a unit normal vector to a plane of circuit board 139A, $N_2$ is a unit normal vector to a plane corresponding to a ground level, and $N_1 \cdot N_2$ is a dot product between vectors $N_1$ and $N_2$.

FIG. 9B shows that reflector 133A may further include pin legs P1 and P2 configured to penetrate openings within printed circuit board 139A, and optionally, openings within conduction member 131A. Use of pin legs P1 and P2 can help secure reflector 133A to conduction member 131A and ensure secure attachment of circuit board 139A to conduction member 131A when reflector 133A is fastened using fasteners 134A and 136A, as shown in FIGS. 9A-9C.

While FIGS. 9A-9C, shows a particular light emitting assembly 130A, various assemblies of light engine 135 include similar elements, such as conduction members 131A-131C, reflectors 133A-133C having sections, multiple light sources for each light emitting assembly 130A-130C, and circuit boards mounted at inclination angles corresponding to respective light emitting assemblies, In an example implementation, light engine 135 includes several light emitting assemblies, such as three light emitting assemblies 130A-130C as indicated in FIG. 8A. In various implementations of light engine 135, any one of the inclination angles for any one of light emitting assemblies 130A-130C is configured to be at least one degree different than any other one of the inclination angles for any other one of light emitting assemblies 130A-130C. For example, a first inclination angle for light emitting assembly 130A (e.g., inclination angle 137A) may be in a range of 15-20 degrees, a second inclination angle for light emitting assembly 130B may be in a range of 20-22 degrees, and a third inclination angle for light emitting assembly 130C may be in a range of 22-25 degrees. In some cases, the first inclination angle may be about 18 degrees, the second inclination angle may be about 20 degrees, and the third inclination angle may be about 23 degrees. Alternatively, in some cases, the first inclination angle may be about 18 degrees, the second inclination angle may be about 21 degrees, and the third inclination angle may be about 24 degrees. Furthermore, in some cases, the first inclination angle may be about 13 degrees, the second inclination angle may be about 18 degrees, and the third inclination angle may be about 20 degrees.

In one example implementation, the first inclination angle may be 18 degrees, the second inclination angle may be 20.5 degrees, and the third inclination angle may be 23 degrees. In another example implementation, the first inclination angle may be 13 degrees, the second inclination angle may be 20 degrees, and the third inclination angle may be 24.25 degrees. In yet another example implementation, the first inclination angle may be 18 degrees, the second inclination angle may be 21.75 degrees, and the third inclination angle may be 24.25 degrees.

As shown, for example, in FIG. 8A, light emitting assemblies 130A-130C may be positioned at different levels. For example, light emitting assembly 130A may be at a top level above light emitting assembly 130B, while light emitting assembly 130C may be at a bottom level below light emitting assembly 130B. In some cases, vertical spacing between different levels may be configured to be the same.

In some implementations the inclination angle selected for the lowest positioned light emitting assembly (e.g., light emitting assembly 130C) may be the highest, and the inclination angle selected for the highest positioned light emitting assembly 130A may be the lowest. In some implementations the difference between the highest inclination angle and the lowest inclination angle can be in a range of one to five degrees.

In some implementations, reflectors 133A-133C may have the same shape. For example, reflectors 133A-133C may include three sections R1-R3, as shown in FIGS. 9B and 9C, each section having the same shape as any other section. In an example embodiment, a section, such as section R1, may have a substantially parabolic shape, and a corresponding light source, such as light source L1, may be placed at about a focal point corresponding to reflective section R1. In various embodiments, the number of sections for reflectors of the light emitting assembly may correspond to the number of light sources for that light emitting assembly.

In various implementations, light emitting assemblies 130A-130C may be mounted, such that conduction members 131A-131C are attached to the conduction frame 120 from the first side (side 1) as shown, for example, in FIG. 8A. Such mounting results in light emitting assemblies being mounted between conduction frame 120 and back side 111A of back section 111 of enclosure 110, and inside enclosure 110. Alternatively, light emitting assemblies may be mounted such that conduction members 131A-131C are attached to the conduction frame 120 from the second side (side 2). Using such mounting, the light emitting assemblies are positioned between conduction frame 120 and front housing assembly 140.

Figure 10B:
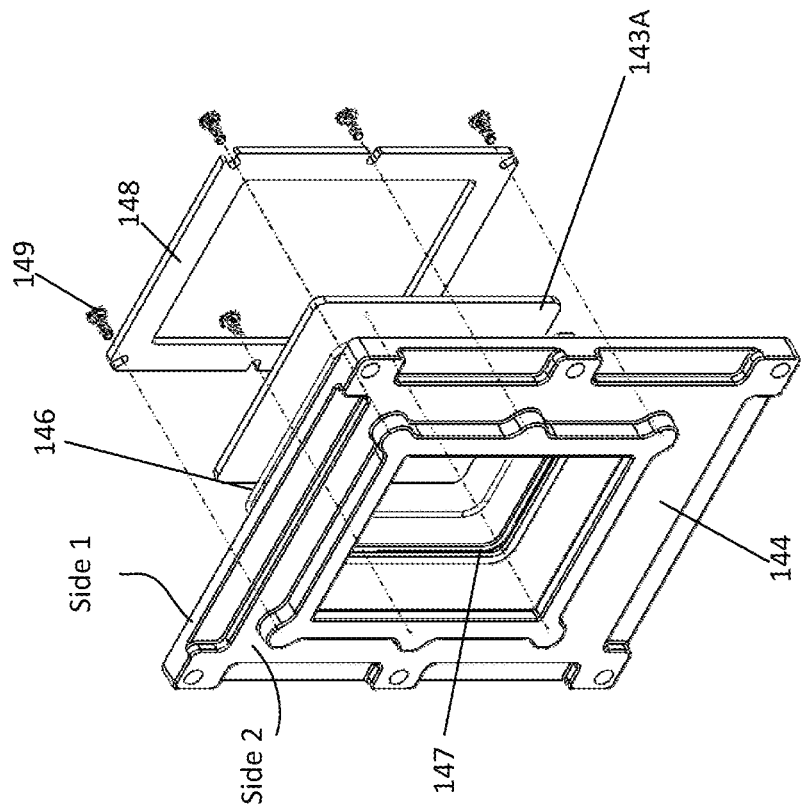
FIGS. 10A-10B are illustrative view of components of a front housing assembly of a lighting system, in accordance with disclosed embodiments.
Figure 10A:
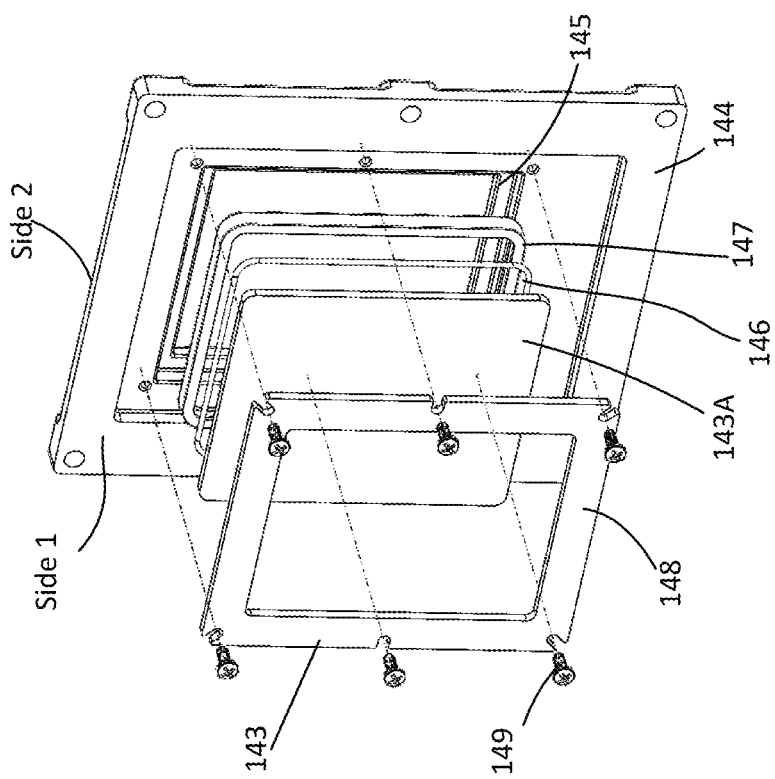

In various embodiments, lighting system 100 includes front housing assembly 140 configured to seal enclosure 110 when being fastened to front mounting frame 114 of front section 113 of enclosure 110. An illustrative exploded view of front housing assembly 140 is shown in FIGS. 10A and 10B. FIG. 10A shows a three-dimensional exploded view of front housing assembly 140 as seen from the direction of a first side (side 1) that faces back side 111A of back section 111 of enclosure 110, while FIG. 10B shows a three-dimensional exploded view of front housing assembly 140 as seen from the direction of a second side (side 2) that faces outwards from enclosure 110.

Front housing assembly 140 includes a front housing member 144 having a front housing groove 145 at a back side (side 1) of front housing member 144, where the back side of front housing member 144 is configured to face back side 111A of back section 111 of enclosure 110, as well as light engine 135 having one or more light emitting assemblies, such as light emitting assemblies 130A-130C.

In various implementations, a flexible gasket 147 is configured to be inserted into the front housing groove 145, thus, providing a flexible interface between front housing member 144 and a transparent member 143A forming a transparent window 143. The front housing groove 145 may have any suitable cross-sectional profile such as circular profile, rectangular profile, elliptical profile and the like. Flexible gasket 147 may include similar profile, such that it can be inserted into housing groove 145. Flexible gasket 147 may be made from any suitable flexible material such as flexible plastic or rubber. In one illustrative implementation, flexible gasket 147 may be made from the same material as O-ring 142.

Transparent member 143A may be any suitable light transmissive element, such as a flat transparent plate, a flat bezel lens, a curved lens, and the like. In various implementations, transparent member 143A is configured to allow a light emitted from the one or more light sources of the one or more light emitting assemblies to exit enclosure 110 via transparent window 143.

Further, front housing assembly 140 may include a heating wire 146, which in some cases may be a nichrome wire heater positioned between flexible gasket 147 and transparent member 143A. Heating wire 146 may be configured to regulate a temperature of transparent member 143A ensuring required transparency of transparent member 143A. Heating wire 146 may provide heating to front housing assembly 140 to ensure that front housing assembly 140 does not accumulate moisture that can reduce transparent properties of transparent member 143A.

Additionally, front housing assembly 140 includes a retainer plate 148 being configured to be fastened to the back side (side 1) of front housing member 144 via fasteners 149 causing securing transparent member 143A, such as flat bezel lens, heating wire 146 and flexible gasket 147 to the back side of front housing member 144.

In various embodiments, front housing assembly 140 configured to seal enclosure 110 such that enclosure 110 is impervious to dust and capable of resisting water penetration when submerged at a depth of up to one meter. The design of front housing assembly 140 strategically positions flexible gasket 147 and heating wire 146 on the inside of enclosure 110, where they are sealed from the environment by transparent member 143A. Transparent member 143A is securely attached to the front housing member 144 using retainer plate 148.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes and illustrates particular embodiments as providing particular advantages, particular embodiments may provide none, some, or all of these advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

What is claimed is:

1. A lighting system comprising:
   an enclosure having a back section, side sections, a front section having a front mounting frame, an interfacing step extending from or coupled to the side sections and disposed between the front section and the back section, and an outer surface configured to facilitate a heat transfer from the enclosure into an environment of the lighting system;
   a conduction frame fastened to the interfacing step to facilitate a heat transfer from the conduction frame to the enclosure through the interfacing step, wherein the conduction frame has a first side facing the back section, a second side facing the front section of the enclosure, and a central opening;
   one or more light emitting assemblies fastened to the conduction frame,
      wherein each of the one or more light emitting assemblies has a conduction member and a light source fastened to the conduction member,
      wherein the conduction member is fastened to the first side of the conduction frame, and the light source attached to the conduction member is situated on the second side of the conduction frame to direct light toward the front section of the enclosure,
      wherein the conduction member is configured to facilitate a heat transfer from the light source to the conduction frame; and
   a front housing assembly fastened to the front mounting frame of the front section to seal the enclosure from the environment of the lighting system.

2. The lighting system of claim 1, further comprising:
   a universal power supply; and
   electromagnetic interference filter circuit; and
   wherein at least one of the universal power supply or the electromagnetic interference filter circuit is mounted onto a back wall of the back section inside the enclosure, thereby facilitating a heat transfer from the at least one of the universal power supply or the electromagnetic interference filter circuit to the enclosure.

3. The lighting system of claim 1, wherein the front housing assembly includes:
   a front housing member having a front housing groove at a back side of the front housing member, the back side of the front housing member facing the one or more light emitting assemblies;
   a flexible gasket configured to be inserted into the front housing groove;
   a flat bezel lens configured to allow a light emitted from the one or more light sources of the one or more light emitting assemblies to exit the enclosure;
   a nichrome wire heater positioned between the flexible gasket and the flat bezel lens; and
   a retainer plate being configured to be fastened to the back side of the front housing member causing securing the flat bezel lens, the nichrome wire heater and the flexible gasket to the back side of the front housing member.

4. The lighting system of claim 1, wherein the outer surface of the enclosure includes fins, wherein the fins promote the heat transfer from the enclosure into the environment of the lighting system.

5. The lighting system of claim 1, wherein the enclosure is rotationally coupled to a support member via a hinge member enabling the enclosure to assume an inclined or declined position with respect to a ground level.

6. The lighting system of claim 5, wherein the enclosure is configured to be secured in the inclined or declined position via both a locking mechanism of the hinge member and a secondary locking mechanism, the secondary locking mechanism providing another coupling of the enclosure and the support member.

7. The lighting system of claim 1, wherein the one or more light emitting assemblies are positioned at a plurality of corresponding levels.

8. The lighting system of claim 1, wherein the sealing of the enclosure causes the enclosure to be impervious to dust and capable of resisting water penetration when submerged at a depth of up to one meter.

9. A lighting system comprising:
an enclosure having a back section, side sections, and a front section;
a universal power supply;
an electromagnetic interference filter circuit;
a light engine including:
a plurality of light emitting assemblies, each one comprising:
a conduction member;
a printed circuit board configured to be mounted onto the conduction member at a corresponding inclination angle;
one or more light sources configured to be mounted onto the printed circuit board; and
a reflector configured to be fastened to the conduction member; and
a conduction frame having a first side facing the back section, a second side facing the front section of the enclosure, and a central opening, wherein the conduction frame is fastened to the plurality of light emitting assemblies and to the enclosure, thereby facilitating a heat transfer from the plurality of light emitting assemblies to the enclosure, wherein the conduction member of each of the plurality of light emitting assemblies is fastened to the first side of the conduction frame and passes through the central opening such that the light source attached to the conduction member is situated on the second side of the conduction frame to direct light toward the front section of the enclosure; and
wherein any one of the inclination angles corresponding to the printed circuit boards of the plurality of light emitting assemblies is at least one degree different than any other one of the inclination angles.

10. The lighting system of claim 9, wherein the plurality of light emitting assemblies includes at least three light emitting assemblies.

11. The lighting system of claim 10, wherein for each one of the plurality of light emitting assemblies any one of the reflectors has an identical reflector shape as any other one of the reflectors.

12. The lighting system of claim 11, wherein the reflector shape comprises a set of sections, each section from the set of sections configured to reflect a light emitted by a light source adjacent to that section.

13. The lighting system of claim 12, wherein each section from the set of sections includes a curved profile.

14. The lighting system of claim 11, wherein the reflector shape includes a reflective coating formed from a polycarbonate resin.

15. The lighting system of claim 9, wherein the plurality of light emitting assemblies includes first, second, and third light emitting assemblies having corresponding first, second, and third printed circuit boards, mounted at corresponding first, second, and third inclination angles, and wherein the first inclination angle is in a range of 15-20 degrees, the second inclination angle is in a range of 20-22 degrees, and the third inclination angle is in a range of 22-25 degrees.

16. The lighting system of claim 9 wherein the plurality of light emitting assemblies is mounted between the conduction frame and a back side of the enclosure inside of the enclosure.

17. The lighting system of claim 9 wherein the enclosure includes a front housing assembly configured to seal the enclosure when being fastened to a front mounting frame of a front side of the enclosure.

18. The light system of claim 17 wherein the plurality of light emitting assemblies is mounted between the conduction frame and the front housing assembly.

19. A lighting system comprising:
an enclosure having a back side, and a front side, the front side including a front mounting frame;
a universal power supply;
an electromagnetic interference filter circuit;
a conduction frame fastened to the enclosure, wherein the conduction frame has a first side facing the back side, a second side facing the front side of the enclosure, and a central opening;
one or more light emitting assemblies fastened to the conduction frame, wherein each of the one or more light emitting assemblies has a conduction member and a light source fastened to the conduction member, wherein the conduction member is fastened to the first side of the conduction frame and passes through the central opening such that the light source attached to the conduction member is situated on the second side of the conduction frame to direct light toward the front side of the enclosure; and
a front housing assembly configured to seal the enclosure when being fastened to the front mounting frame of the front side, the front housing assembly including:
a front housing member having a front housing groove at a back side of the front housing member, the back side of the front housing member facing the one or more light emitting assemblies;
a flexible gasket configured to be inserted into the front housing groove;
a flat bezel lens configured to allow a light emitted from the one or more light sources of the one or more light emitting assemblies to exit the enclosure;
a nichrome wire heater positioned between the flexible gasket and the flat bezel lens; and
a retainer plate being configured to be fastened to the back side of the front housing member causing securing the flat bezel lens, the nichrome wire heater and the flexible gasket to the back side of the front housing member.

20. The lighting system of claim 19, wherein the nichrome wire heater is configured to regulate a temperature of the flat bezel lens, ensuring required transparency of the flat bezel lens.

21. The lighting system of claim 19, wherein the front mounting frame of the front side includes a front side groove having a selected profile, the lighting system further comprising a flexible O-ring having a circular profile and configured to be inserted into the front side groove, such that at least a portion of the flexible O-ring is extending beyond the front side groove, and wherein the fastening of the front housing assembly to the front mounting frame of the front side includes at least partially compressing the flexible O-ring.

\* \* \* \* \*